United States Patent
Schmitt et al.

(10) Patent No.: US 9,765,669 B2
(45) Date of Patent: Sep. 19, 2017

(54) METHOD FOR INJECTING REDUCTANT INTO AN EXHAUST GAS OF AN ENGINE USING AN OSCILLATING SUPPLY PRESSURES

(71) Applicant: Deere & Company, Moline, IL (US)

(72) Inventors: Josh C Schmitt, Waterloo, IA (US); Scott A Chase, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 98 days.

(21) Appl. No.: 14/868,781

(22) Filed: Sep. 29, 2015

(65) Prior Publication Data

US 2017/0089243 A1    Mar. 30, 2017

(51) Int. Cl.

| | |
|---|---|
| *F01N 3/00* | (2006.01) |
| *F01N 3/20* | (2006.01) |
| *F01N 3/035* | (2006.01) |
| *F01N 11/00* | (2006.01) |
| *F01N 9/00* | (2006.01) |
| *F01N 3/025* | (2006.01) |

(52) U.S. Cl.
CPC ........... *F01N 3/208* (2013.01); *F01N 3/0253* (2013.01); *F01N 3/035* (2013.01); *F01N 3/206* (2013.01); *F01N 9/00* (2013.01); *F01N 11/002* (2013.01); *F01N 2610/02* (2013.01); *F01N 2610/03* (2013.01); *F01N 2900/0414* (2013.01); *F01N 2900/1404* (2013.01); *F01N 2900/1411* (2013.01); *F01N 2900/1808* (2013.01); *F01N 2900/1812* (2013.01)

(58) Field of Classification Search
CPC ............................... F01N 3/035; F01N 11/002
USPC .......................................................... 60/295
See application file for complete search history.

(56) References Cited

U.S. PATENT DOCUMENTS

| | | | |
|---|---|---|---|
| 8,074,444 B2 * | 12/2011 | Kawakita | F01N 3/2066 60/286 |
| 8,171,721 B2 | 5/2012 | Boddy et al. | |
| 8,615,987 B2 | 12/2013 | Dentici | |
| 8,813,475 B2 | 8/2014 | Cho et al. | |
| 2008/0264043 A1 | 10/2008 | Kawakita et al. | |
| 2014/0165539 A1 * | 6/2014 | Nagata | F01N 3/208 60/286 |

FOREIGN PATENT DOCUMENTS

| | | |
|---|---|---|
| WO | 2011132218 A1 | 10/2011 |
| WO | 2013089626 A1 | 6/2013 |

OTHER PUBLICATIONS

European Search Report in foreign counterpart application No. 16190372.9 dated Jan. 26, 2017 (6 pages).

* cited by examiner

*Primary Examiner* — Jason Shanske (57) ABSTRACT

A method for injecting a reductant into an exhaust gas of a power system. The method includes injecting the reductant at a commanded flow rate, while simultaneously oscillating a supply pressure of the reductant between a higher supply pressure and a lower supply pressure.

24 Claims, 5 Drawing Sheets

METHOD FOR INJECTING REDUCTANT INTO AN EXHAUST GAS OF AN ENGINE USING AN OSCILLATING SUPPLY PRESSURES

FIELD OF THE DISCLOSURE

The present disclosure relates to a method for injecting reductant into an exhaust gas of a power system, using an oscillating supply pressure.

BACKGROUND OF THE DISCLOSURE

Manufacturers of engines meet set emissions regulations via aftertreatment systems. Tier 3, Interim Tier 4, and Final Tier 4 emissions regulations, for example, required substantial reductions in particulate matter ("PM") and nitrogen oxides ("$NO_x$"). Beyond the Final Tier 4 emissions regulation, drivers for the continued evolution of aftertreatment systems may include more stringent emissions standards; lower ownership costs, such as the initial cost of purchase; and more compact, modular solutions. Some aftertreatment systems include a diesel oxidation catalyst ("DOC"), a diesel particulate filter ("DPF") for reducing PM, and a selective catalytic reduction ("SCR") catalyst for removing $NO_x$. Such systems may have relatively high ownership costs and require relatively large design spaces.

One way to reduce the design space of such a system is to decrease the volume between the DPF and the SCR catalyst, referred to as a mixing volume. Decreasing the mixing volume, however, presents challenges in getting adequate mixing of the exhaust gas and the reductant, so as to fully leverage the SCR catalyst's ability to reduce $NO_x$ levels.

SUMMARY OF THE DISCLOSURE

Disclosed is a method for injecting a reductant into an exhaust gas of a power system. The method includes injecting the reductant at a commanded flow rate, while simultaneously oscillating a supply pressure of the reductant between a higher supply pressure and a lower supply pressure. Such a method may aid in mixing the reductant and the exhaust gas, and may aid in designing a smaller, shorter mixing volume between the DPF and the SCR catalyst.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
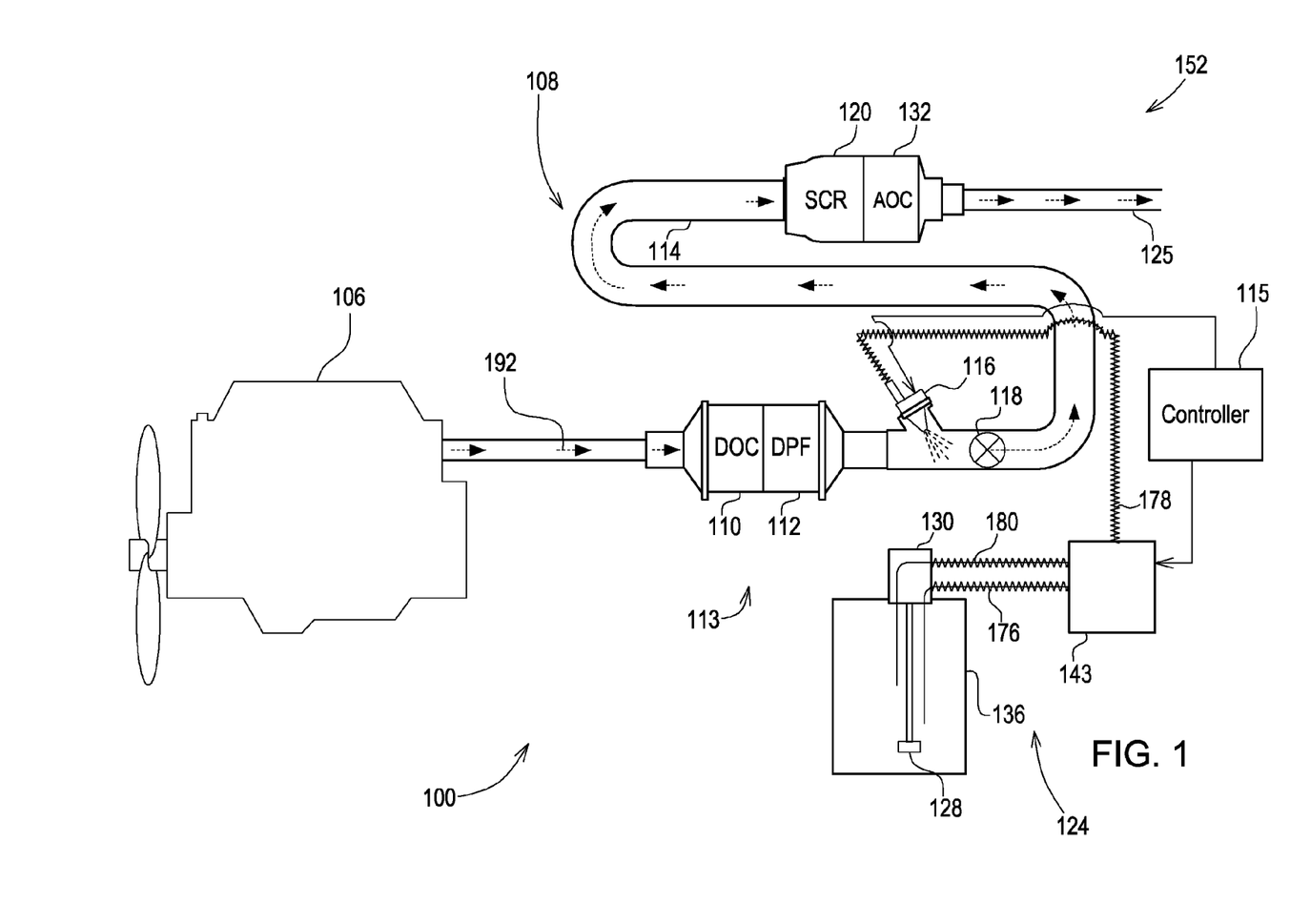
FIG. 1 is a schematic illustration of an example of a power system.

Referring to FIG. 1, there is shown a schematic illustration of a power system 100 for providing power to a variety of machines, including on-highway trucks, construction vehicles, marine vessels, stationary generators, automobiles, agricultural vehicles, and recreation vehicles. An engine 106 of the power system 100 may be any kind that produces an exhaust gas, the exhaust gas and flow direction being indicated by directional arrow 192. The engine 106 may be an internal combustion engine, such as a gasoline engine, a diesel engine, a gaseous fuel burning engine (e.g., natural gas), or any other exhaust gas producing engine. The engine 106 may be of any size, with any number cylinders, and in any configuration (e.g., "V," inline, and radial).

The power system 100 includes an exhaust system 108, having components for directing exhaust gas from the engine 106 to the atmosphere. The exhaust system 108 includes an aftertreatment system 113, and at least some of the exhaust gas passes therethrough. The aftertreatment system 113 removes, for example, PM and $NO_x$ emissions present in the exhaust gas received from the engine 106.

The aftertreatment system 113 is shown having a DOC 110, a DPF 112 positioned downstream thereof, and an SCR system 152 positioned downstream thereof. The SCR system 152 may include an SCR catalyst 120 and an ammonia oxidation catalyst 132 positioned downstream thereof.

In some embodiments, the SCR system 152 may include a reductant delivery system 124 that is followed by an SCR+F, the SCR+F including a DPF and a selective catalytic reduction catalyst applied thereto. Integrating the DPF and SCR functions in a single component, the SCR+F, may aid in reducing costs, meeting packaging constraints, and enhancing the performance of the SCR system 152. Such embodiments may require a secondary SCR catalyst positioned downstream of the SCR+F.

The exhaust gas flows through each component of the aftertreatment system 113, and after being treated, is expelled into the atmosphere via a tailpipe 125. Exhaust gas exiting therefrom has significantly fewer pollutants—such as PM, $NO_x$, and hydrocarbons—than an untreated exhaust gas would have.

The DOC 110 may be configured in a variety of ways and contain catalyst materials useful in collecting, absorbing, adsorbing, and/or converting hydrocarbons, carbon monoxide, and/or oxides of nitrogen contained in the exhaust gas. Such catalyst materials may include, for example, aluminum, platinum, palladium, rhodium, barium, cerium, and/or alkali metals, alkaline-earth metals, rare-earth metals, or combinations thereof. The DOC 110 may include, for example, a ceramic substrate, a metallic mesh, foam, or any other porous material known in the art, and the catalyst materials may be located on, for example, a substrate of the DOC 110. The DOC 110 may also oxidize NO contained in the exhaust gas, thereby converting it to $NO_2$ upstream of the SCR catalyst 120.

The DPF 112 may be any of various particulate filters known in the art that are capable of reducing PM in the exhaust gas, so as to meet requisite emission standards. Any structure capable of removing PM from the exhaust gas of the engine 106 may be used. For example, the DPF 112 may include a wall-flow ceramic substrate having a honeycomb cross-section constructed of cordierite, silicon carbide, or other suitable material to remove the PM.

The reductant delivery system 124 may include a reductant tank 136 for storing the reductant. One example of a reductant is a solution having 32.5% high purity urea and 67.5% deionized water (e.g., DEF), which decomposes as it travels through a decomposition tube 114 to produce ammonia. The reductant delivery system 124 may include a reductant header 130 mounted to the reductant tank 136, the reductant header 130 further including, in some embodiments, a level sensor 128 for measuring a quantity of the reductant in the reductant tank 136. The level sensor 128 may include a float configured to float at a liquid, air surface interface of reductant included within the reductant tank 136.

The decomposition tube 114 may be positioned downstream of the reductant injector 116 but upstream of the SCR catalyst 120. The decomposition tube 114 may be shorter or longer than what is implied in FIG. 1. Its actual length may depend on, for example, its available design space, and mixing requirements of the overall aftertreatment system 113. The reductant injector 116 may be, for example, an injector that is selectively controllable to inject reductant directly into the exhaust gas.

As shown, the SCR system 152 may include a reductant mixer 118 that is positioned upstream of the SCR catalyst 120, but downstream of the reductant injector 116. To increase the injection rate of the reductant, the reductant injector 116 may remain open for a longer period of time during each opening thereof. To decrease the injection rate of the reductant, the reductant injector 116 may remain open for a shorter period of time during each opening thereof.

The reductant delivery system 124 may additionally include a reductant pressure source and a reductant extraction passage 176. The extraction passage 176 may be coupled fluidly to the reductant tank 136 and the reductant pressure source therebetween. The reductant delivery system 124 may further include a reductant supply module 143. A controller 115 may control the reductant supply module 143 and, thus, a reductant supply pressure.

The controller 115 may be an engine control unit ("ECU") or engine control module ("ECM") that controls various elements of the power system 100, including the timing duration and phasing of fuel injectors, or another controller. The controller 115 may be communicatively connected with other components of the power system 100, such as a high pressure fuel pump, an exhaust gas recirculation system, and/or the aftertreatment system 113 for monitoring and controlling various functions thereof. In some embodiments, the controller 115 may be part of a controller area network ("CAN"), in which the controller 115, sensors, and actuators of the power system 100 communicate via digital CAN messages.

The reductant delivery system 124 may also include a reductant dosing passage 178 and a reductant return passage 180. The return passage 180 is shown extending into the reductant tank 136, though in some embodiments of the power system 100, the return passage 180 may be coupled to a return tube via the reductant header 130. The reductant delivery system 124 may have—among other things—valves, orifices, sensors, and pumps positioned in the extraction passage 176, reductant dosing passage 178, and return passage 180.

As discussed above, the reductant decomposes as it travels through the decomposition tube 114 and produces $NH_3$. The $NH_3$ reacts with $NO_x$ in the presence of the SCR catalyst 120, and it reduces the $NO_x$ to less harmful emissions, such as $N_2$ and $H_2O$. The SCR catalyst 120 may be any of various catalysts known in the art. For example, in some embodiments, the SCR+F 120 may be a vanadium-based catalyst. In other embodiments, the SCR catalyst 120 may be a zeolite-based catalyst, such as a Cu-zeolite or a Fe-zeolite.

The AOC 132 may be any of various flowthrough catalysts for reacting with $NH_3$ and thereby produce nitrogen. Generally, the AOC 132 is utilized to remove $NH_3$ that has slipped through the SCR catalyst 120.

Figure 2:
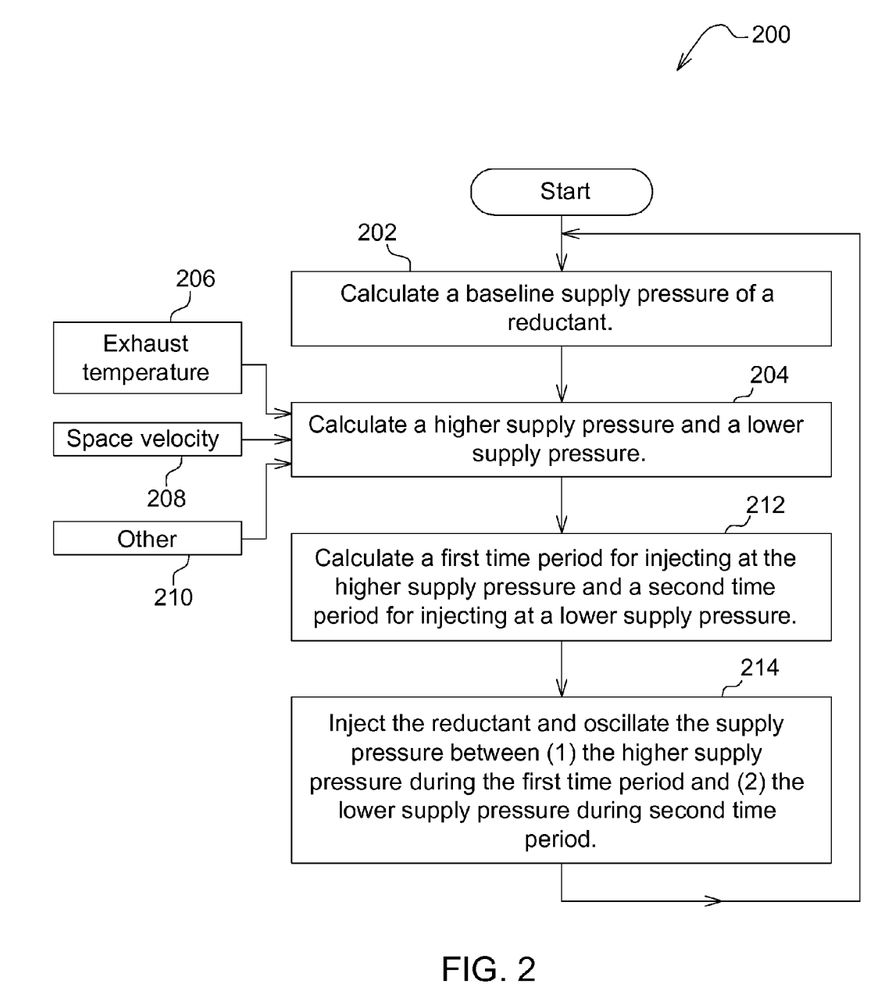
FIG. 2 is an example of a method for injecting the reductant.

Shown in FIG. 2 is a method 200 for injecting reductant into the exhaust gas exiting from the engine 106. The method 200 includes injecting a reductant at a commanded flow rate during a given time period, but simultaneously oscillating a supply pressure of the reductant between a higher supply pressure and a lower supply pressure during the given time period. At act 202, the controller 115 may calculate a baseline supply pressure. The baseline supply pressure may be based on, for example, a physical state of the power system 100, or an injection rate to control a physical state of the power system 100. In some embodiments of method 200, the controller 115 may not calculate the baseline supply pressure, as it may be a single, consistent value.

At act 204, the controller 115 may calculate a higher supply pressure based on a baseline supply pressure, the higher supply pressure being higher than the baseline supply pressure. And further, at act 204, the controller 115 may calculate a lower supply pressure based on the baseline supply pressure, the lower supply pressure being lower than the baseline supply pressure. The baseline supply pressure may be a pressure that is high enough to meet the reductant flow rate requirements, but lower than a maximum supply pressure.

Figure 3:
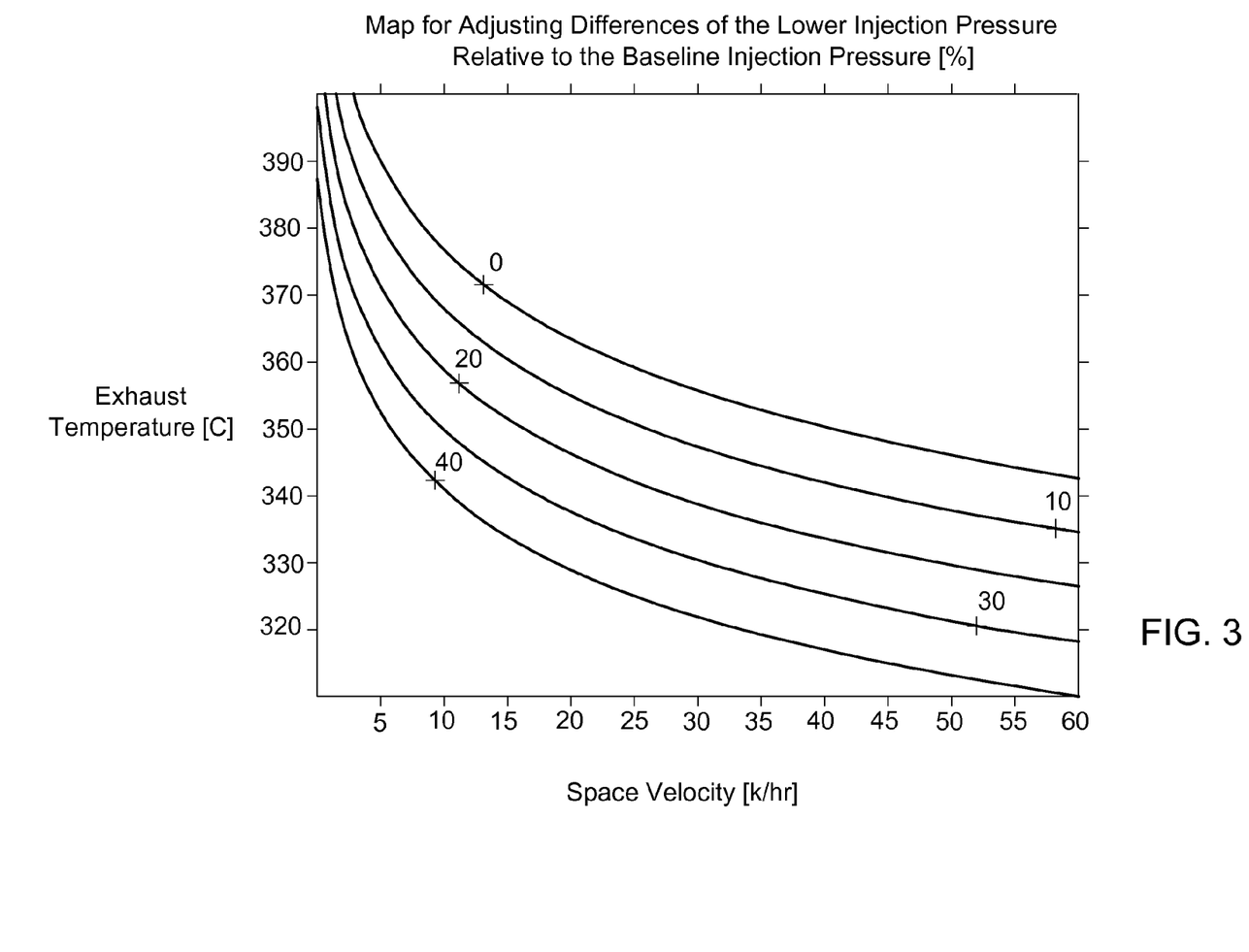
FIG. 3 is an example of a map for adjusting differences of a lower injection pressure relative to a baseline injection pressure.
Figure 4:
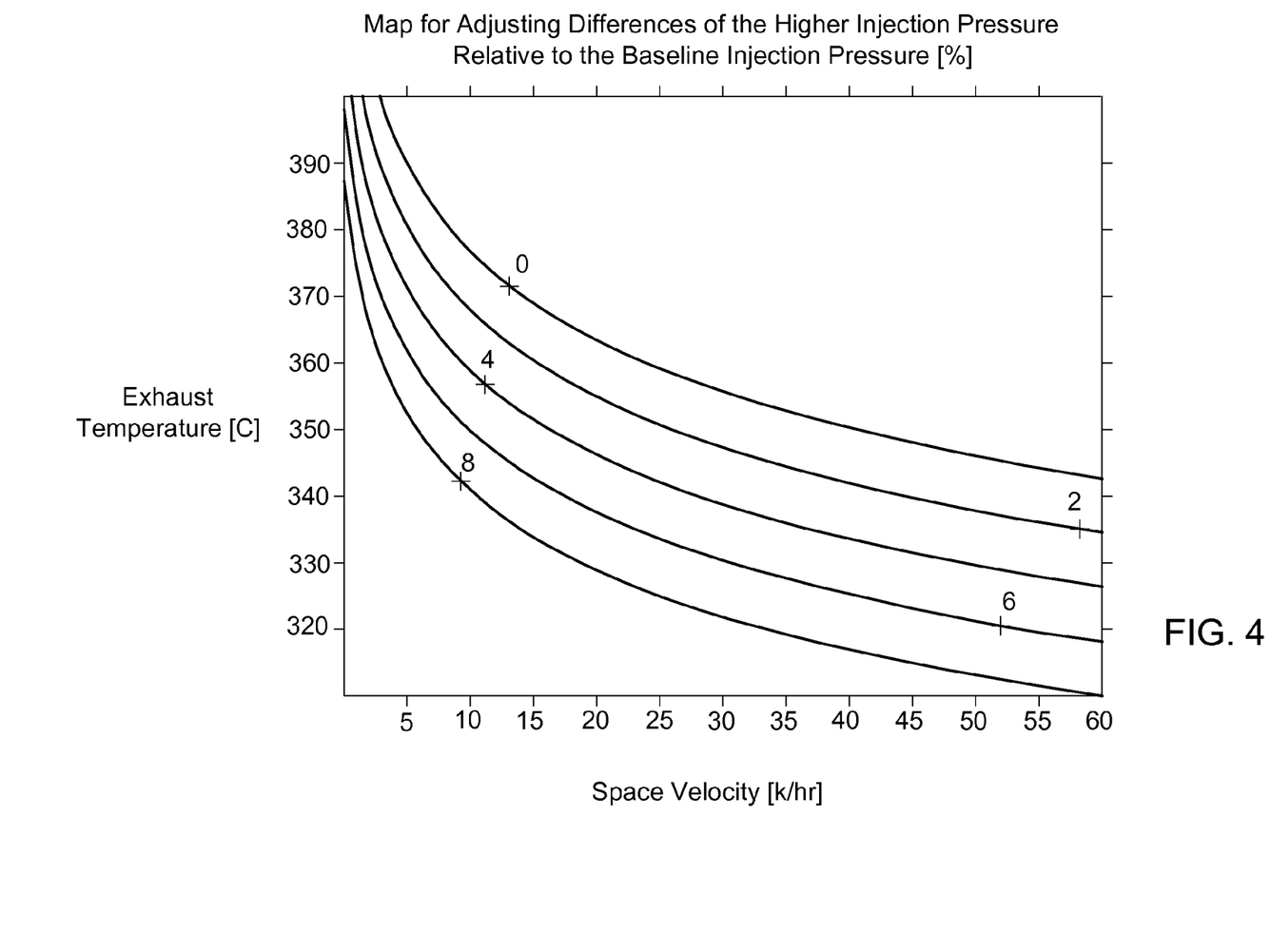
FIG. 4 is an example of a map for adjusting differences of a higher injection pressure relative to the baseline injection pressure.

At act 204, the controller 115 may calculate the higher and lower supply pressures based on an exhaust temperature 206, a space velocity 208, or some other value 210. Likewise, the baseline supply pressure may also be based on such values. An example methodology for such calculations is illustrated in FIGS. 3 and 4 and may be implemented via the controller 115. The map in FIG. 3, for example, illustrates that for a given exhaust temperature 206 and a given space velocity 208, the difference between the lower injection pressure relative to the baseline pressure may be a certain percent. Using this example map, when the exhaust temperature 206 is about 330° C. and the space velocity 208 is about 15 k/hr, then the lower supply pressure may be about 40% lower than the baseline supply pressure. The map in FIG. 4 is read similarly, but indicates higher percentages (e.g., the higher supply pressure may be X % higher than the baseline supply pressure).

The exhaust temperature 206 may be a temperature related to the DOC 110, the DPF 112, SCR catalyst 120, or the AOC 132, to name just a few examples. The exhaust temperature 206 may be a measured temperature or a calculated temperature.

The space velocity 208 may be a space velocity 208 of the DOC 110, the DPF 112, the SCR catalyst 120, or the AOC 132, again to name just a few examples. The space velocity 208 may be an exhaust volumetric flow rate divided by the volume of the component (e.g., how many times per unit time an entire volume of exhaust gas is replaced therein). One unit that may be used for space velocity 208 is 1000 s of times per hour (i.e., k/hr).

The other value 210 may be, for example, a $NO_x$ concentration value, a humidity value, an ambient temperature value, a load value, a speed value, or any other physical state of the power system 100 that is available to the controller 115. Further, the physical state may be a measured value, a modeled value, or a calculated value, for example.

The difference between the baseline supply pressure and the lower supply pressure may be substantially greater in magnitude than a difference between the higher supply pressure and the baseline supply pressure. For example, the difference between the baseline supply pressure and the lower supply pressure may be quite large in magnitude, as the reductant injector 116 may be able to remain open for a longer period of time and still reach the commanded flow rate (e.g., the lower supply pressure may only be 40-70% of the baseline supply pressure). But, the difference between the higher supply pressure and the baseline supply pressure may be smaller, as a result of supply pressure limitations (e.g., the higher supply pressure may only be 10-30% higher than the baseline pressure).

In some embodiments of the method 200, the higher supply pressure may be one of a plurality of higher supply pressures, and the lower supply pressure may also be one of a plurality. In such as a case, at 204, the controller 115 may calculate the higher and lower supply pressures based on the baseline supply pressure. The set of the higher supply pressures is in immediate sequence with the set of the lower supply pressures. An average difference between the baseline and the lower supply pressures may be substantially greater in magnitude than an average difference between the higher and the baseline supply pressure. This average difference may occur for the same reasons as discussed above (i.e., limitations of higher supply pressures versus flexibility of lower supply pressures).

Figure 5:
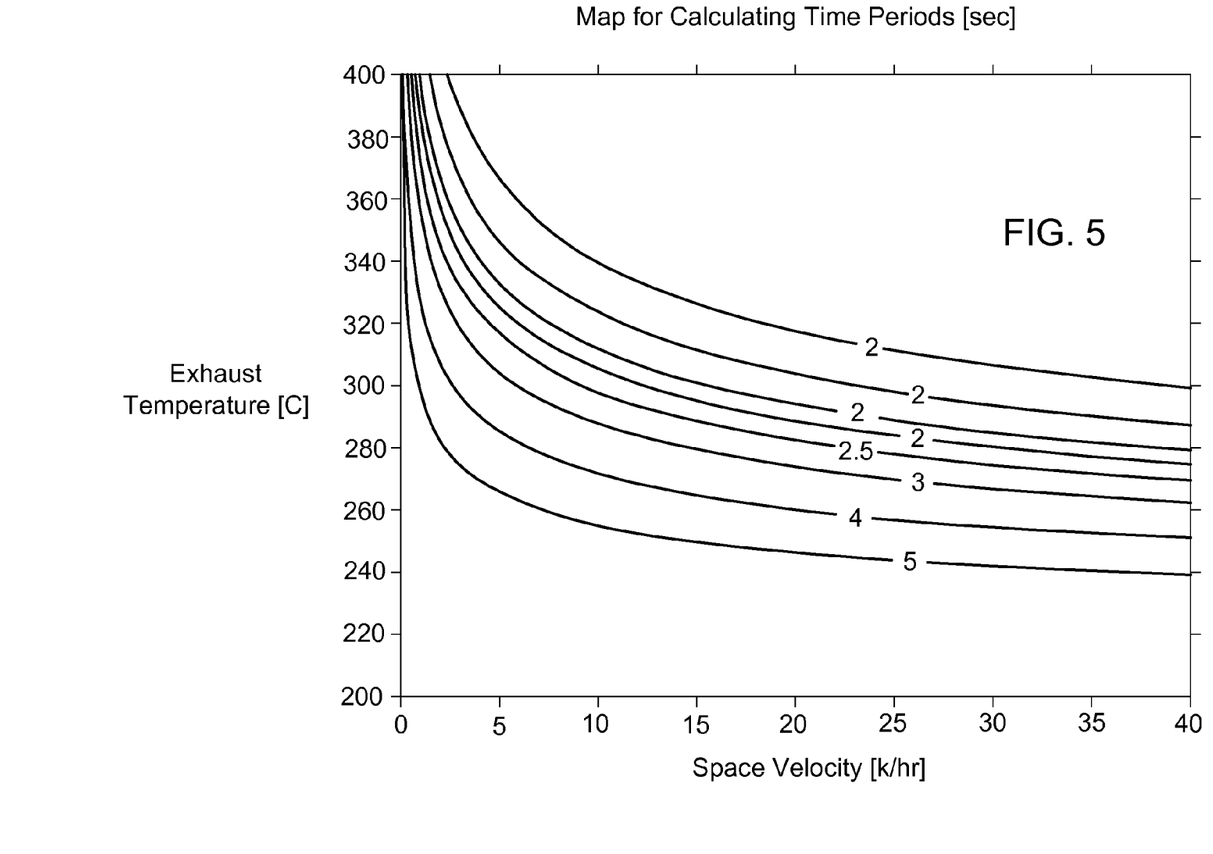
FIG. 5 is an example of a map for calculating time periods.

At act 212, the controller 115 may calculate a first time period for injecting at the higher supply pressure, and a second time period for injecting at the lower supply pressure. An example methodology for such calculations is shown in FIG. 5 and may be implemented via the controller 115. This map illustrates that for a given exhaust temperature 206 and a given space velocity 208, the time periods may be for a certain number of seconds. The first and second time periods may be the same length, or each may be unique.

At act 214, the controller 115 injects the reductant at the commanded flow rate during the given time period (the physical injection being via the reductant injector 116), but simultaneously oscillates the supply pressure of the reductant between the higher supply pressure and the lower supply pressure during the same given time period. The controller 115 may calculate the commanded flow rate based on, for example, a flow rate required to adequately reduce $NO_x$ in the exhaust gas as it exits the aftertreatment system 113. The commanded flow rate may be maintained by opening and closing the reductant injector 116, so as to compensate for the supply pressure varying between the higher and lower supply pressures.

At act 214, the controller 115 may compensate for oscillations in the supply pressure of the reductant, so as to maintain a constant flow rate of the reductant being injected. To do this, the controller 115 may, for example, open the reductant injector 116 for longer or shorter periods of time, depending on what is necessary to maintain a constant flow rate. Maintaining a constant flow rate may aid in keeping a consistent $NH_3$ storage level on the SCR catalyst 120.

When the reductant injector 116 is open, the pressurized reductant penetrates into the exhaust gas. The reductant injector 116 has penetration characteristics that vary as a function of the supply pressure. When the supply pressure increases, a penetration depth increases and vice-versa. Some embodiments of the method 200 may dither the supply pressure at half the frequency of the reductant injector opening frequency. During half of the reductant injector openings, the supply pressure may be at the high point in the dithering cycle, and during the other half, it may be at a low point. This way, half of the injections have a nominal penetration depth corresponding to the high point in the supply pressure, and the other half, to the low point.

By implementing method 200 as such, half of the reductant injections have a low penetration depth, and the other half have a high penetration depth. This may improve mixing of the reductant and the exhaust gas by increasing the natural distribution of reductant as it is initially injected therein. Temporal non-uniformities may be buffered by $NH_3$ that is stored in the SCR catalyst 120.

In some embodiments of act 214, the oscillating may include oscillating the supply pressure of the reductant between the higher supply pressure for a single injection of the reductant and the lower supply pressure for a next single injection of the reductant. But in other embodiments, the oscillating may include oscillating the supply pressure of the reductant between the higher supply pressure for a plurality of injections of the reductant, and the lower supply pressure for a next plurality of the injections. In some embodiments, the method 200 may randomly modify the supply pressure about the baseline supply pressure with no periodic nature or dependence upon a system variable. In other embodiments, the method 200 may dither the supply pressure, between the higher pressure and the lower pressure, at one-third of the injector pulse frequency, one-fourth, and so on.

As the method 200 repeats, the controller 115 may increase a difference between the baseline and the lower supply pressures when the space velocity 208 decreases, or in contrast, may decrease a difference between the lower supply pressures and the baseline supply pressure when the space velocity 208 increases. Further, as the method 200 repeats, the controller 115 may increase a difference between the baseline and the lower supply pressures when the exhaust temperature 206 decreases, or in contrast, may decrease a difference between the baseline and the lower supply pressures when the exhaust temperature 206 increases. Similar increases and decreases may occur with respect to the higher injection pressure relative to the baseline injection pressure. Such increases and decreases in the difference may be calculated in act 204 and implemented in act 214.

FIGS. 3 and 4 illustrate an example strategy for adjusting the differences. In certain instances, the difference may already be at a bound (i.e., too high or low), resulting in a hold instead of an adjustment.

Factors for increasing and decreasing the higher and lower supply pressures may include the ability of the controller 115 to respond quickly enough, flow limitations of the reductant injector 116, and reductant deposit formation risk. As shown in FIGS. 3 and 4, decreasing the difference of the higher and lower supply pressures relative to the baseline supply pressure may be beneficial as the space velocity 208 increases. At high space velocities and, thus, high reductant flow rates, the reductant injector 116 may approach its flow limit, which may require a more constant pressure to achieve the high reductant flow rate.

Decreasing the difference of the higher and lower supply pressures relative to the baseline supply pressure may be beneficial as the exhaust temperature 206 increases. As the exhaust temperature 206 increases, $NH_3$ oxidation begins to dominate and the $NO_x$ conversion rate begins to decrease. This reduces the need for high $NH_3$ uniformity.

Further, as the method 200 repeats, the controller 115 may decrease the first and second time periods when the exhaust temperature 206 increases, or alternatively it may increase the first and second time periods when the exhaust temperature 206 decreases. Such increases and decreases in the difference may be calculated in act 204 and implemented in act 214. FIG. 5 illustrates an example strategy for adjusting the time periods.

Still further, as the method 200 repeats, the controller 115 may decrease the first and second time periods when the space velocity 208 increases, or in contrast, it may increase the first and second time periods when the space velocity 208 decreases. Such increases and decreases in the difference may be calculated in act 204 and implemented in act 214. In certain instances, the time periods may already be at a bound (i.e., too short or long), resulting in a hold instead of a change.

Further yet, as the method 200 repeats, the controller 115 may increase an opening time period when the supply pressure oscillates to the lower supply pressure, or alternatively may decrease the opening time period when the supply pressure oscillates to the higher supply pressure. Such increases and decreases in the difference may be calculated in act 204 and implemented in act 214. In some operating modes, the opening time may already be at a bound (i.e., too short or long), resulting in a hold instead of an adjustment.

Referring back to FIG. 5, shorter first and second time periods may be beneficial at higher space velocities. This is because the flow rate of $NO_x$ and $NH_3$ increases, as compared to the amount of $NH_3$ stored on the SCR catalyst 120. This quickens the dynamic response of the SCR catalyst 120. At higher space velocities, the $NO_2$ reduction front will progress from the front to the back of the SCR catalyst 120 more quickly. The same is also true of the $NH_3$ storage. For similar but opposite reasons, longer first and second time periods may be beneficial at lower space velocities.

Shorter first and second time periods may be more appropriate at higher exhaust temperatures. This is because the $NH_3$ storage on the SCR catalyst 120 decreases as its temperature increases. This decreases the amount of stored $NH_3$, and fundamentally quickens the dynamic response of the SCR catalyst 120. The same is also true of the $NH_3$ storage. For similar but opposite reasons, longer first and second time periods may be more beneficial at higher space velocities.

Though not shown in FIG. 5, shorter first and second time periods may also be more appropriate at higher $NO_x$ concentrations. This is because increases in the $NO_x$ concentration then increase the rate at which $NO_x$ flows through the SCR catalyst 120 relative to the amount of $NH_3$ stored thereon. The dynamic effect is similar to increasing space velocity 208 and temperature, given that it quickens the dynamic response of the SCR catalyst 120.

In some embodiments of method 200, the time periods may remain relatively constant. Additionally, the time period may also be based on controllability limitations. For example, the time period may always be equivalent to—or greater than—a cycle rate of the reductant injector 116 (e.g., 1 second).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A method for injecting a reductant into an exhaust gas of a power system, the method comprising:
    injecting the reductant at a commanded flow rate;
    calculating a baseline supply pressure of the reductant;
    calculating a higher supply pressure based on the baseline supply pressure, the higher supply pressure being higher than the baseline supply pressure;
    calculating a lower supply pressure based on the baseline supply pressure, the lower supply pressure being lower than the baseline supply pressure;
    oscillating a supply pressure of the reductant between the higher supply pressure and the lower supply pressure; and
    increasing a difference between the higher supply pressure and the baseline supply pressure when a space velocity decreases.

2. The method of claim 1, wherein the injecting comprises compensating for oscillations in the supply pressure so as to maintain a constant flow rate of the reductant being injected.

3. The method of claim 1, further comprising calculating the commanded flow rate based on one or more physical states of the power system.

4. The method of claim 1, further comprising calculating the higher and lower supply pressure based on one or more physical states of the power system.

5. The method of claim 1, further comprising calculating the higher and lower supply pressures based on an exhaust temperature.

6. The method of claim 1, further comprising calculating the higher and lower supply pressures based on a space velocity.

7. The method of claim 1, wherein the oscillating comprises oscillating the supply pressure of the reductant between the higher supply pressure for a single injection of the reductant and the lower supply pressure for a next single injection of the reductant.

8. The method of claim 1, wherein a difference between the baseline supply pressure and the lower supply pressure is greater in magnitude than a difference between the higher supply pressure and the baseline supply pressure.

9. The method of claim 1, further comprising increasing a difference between the baseline supply pressure and the lower supply pressure when a space velocity decreases.

10. The method of claim 1, further comprising decreasing a difference between the higher supply pressure and the baseline supply pressure when a space velocity increases.

11. The method of claim 1, further comprising decreasing a difference between the baseline supply pressure and the lower supply pressure when a space velocity increases.

12. The method of claim 1, further comprising increasing a difference between the higher supply pressure and the baseline supply pressure when an exhaust temperature decreases.

13. The method of claim 1, further comprising increasing a difference between the baseline supply pressure and the lower supply pressure when an exhaust temperature decreases.

14. The method of claim 1, further comprising decreasing a difference between the higher supply pressure and the baseline supply pressure when an exhaust temperature increases.

15. The method of claim 1, further comprising decreasing a difference between the baseline supply pressure and the lower supply pressure when and exhaust temperature increases.

16. The method of claim 1, further comprising:
    calculating a first time period for injecting at the higher supply pressure; and
    calculating a second time period for injecting at the lower supply pressure.

17. The method of claim 16, further comprising:
decreasing the first and second time periods when an exhaust temperature increases; and
increasing the first and second time periods when an exhaust temperature decreases.

18. The method of claim 16, further comprising:
decreasing the first and second time periods when a space velocity increases; and
increasing the first and second time periods when a space velocity decreases.

19. The method of claim 16, further comprising:
decreasing an opening time period when the supply pressure oscillates to the higher supply pressure; and
increasing an opening time period when the supply pressure oscillates to the lower supply pressure.

20. The method of claim 1, wherein the oscillating comprises oscillating the supply pressure of the reductant between the higher supply pressure for a plurality of injections of the reductant and the lower supply pressure for a next plurality of injections of the reductant, the pluralities being in immediate sequence.

21. The method of claim 20, the higher supply pressure being one of a plurality of higher supply pressures, the lower supply pressure being one of a plurality of lower supply pressures, and the method further comprising:
calculating the higher supply pressures based on the baseline supply pressure, the higher supply pressures being higher than the baseline supply pressure; and
calculating the lower supply pressures based on the baseline supply pressure, the lower supply pressures being lower than the baseline supply pressure.

22. The method of claim 21, wherein an average difference between the baseline supply pressure and the lower supply pressures is greater in magnitude than an average difference between the higher supply pressures and the baseline supply pressure.

23. The method of claim 1, wherein the injecting and the oscillating occur simultaneously.

24. A method for injecting a reductant into an exhaust gas of a power system, the method comprising:
injecting the reductant at a commanded flow rate;
calculating a baseline supply pressure of the reductant;
calculating a higher supply pressure based on the baseline supply pressure, the higher supply pressure being higher than the baseline supply pressure;
calculating a lower supply pressure based on the baseline supply pressure, the lower supply pressure being lower than the baseline supply pressure;
oscillating a supply pressure of the reductant between the higher supply pressure and the lower supply pressure; and
increasing a difference between the higher supply pressure and the baseline supply pressure when an exhaust temperature decreases.

* * * * *